(12) United States Patent
Schofield

(10) Patent No.: US 7,252,223 B2
(45) Date of Patent: Aug. 7, 2007

(54) MULTIPLE-NETWORK SYSTEM AND METHOD FOR LOADING, TRANSFERRING AND REDEEMING VALUE THROUGH STORED VALUE ACCOUNTS

(75) Inventor: Richard W. Schofield, Redding, CA (US)

(73) Assignee: Air-Bank LLC, DeSoto, TX (US)

( * ) Notice: Subject to any disclaimer, the term of this patent is extended or adjusted under 35 U.S.C. 154(b) by 114 days.

(21) Appl. No.: 11/131,640

(22) Filed: May 18, 2005

(65) Prior Publication Data

US 2005/0269396 A1 Dec. 8, 2005

Related U.S. Application Data

(60) Provisional application No. 60/572,641, filed on May 18, 2004.

(51) Int. Cl.
*G07D 11/00* (2006.01)
*G06K 5/00* (2006.01)

(52) U.S. Cl. .................... 235/379; 235/380

(58) Field of Classification Search ............... 235/379, 235/380, 381, 375, 382, 382.5; 705/39, 75, 705/41

See application file for complete search history.

(56) References Cited

U.S. PATENT DOCUMENTS

| | | | |
|---|---|---|---|
| 6,138,107 A * | 10/2000 | Elgamal | 705/39 |
| 6,963,857 B1 * | 11/2005 | Johnson | 705/39 |
| 7,031,939 B1 * | 4/2006 | Gallagher et al. | 705/39 |
| 7,035,824 B2 * | 4/2006 | Nel | 705/42 |
| 7,146,338 B2 * | 12/2006 | Kight et al. | 705/42 |
| 2003/0069842 A1 | 4/2003 | Kight et al. | |
| 2003/0126075 A1 * | 7/2003 | Mascavage et al. | 705/39 |
| 2003/0126094 A1 * | 7/2003 | Fisher et al. | 705/75 |
| 2003/0163415 A1 * | 8/2003 | Shanny et al. | 705/39 |
| 2003/0233317 A1 * | 12/2003 | Judd | 705/39 |
| 2005/0061872 A1 * | 3/2005 | Paschini et al. | 235/380 |
| 2005/0257045 A1 * | 11/2005 | Bushman et al. | 713/156 |

* cited by examiner

*Primary Examiner*—Thien M. Le
(74) *Attorney, Agent, or Firm*—David W. Carstens; Carstens & Cahoon, LLP

(57) ABSTRACT

A system and method for loading, transferring and redeeming value whereby two different systems of stored value accounts, one system being on a major network and the second system being on a secondary network, are linked, providing multiple paths to perform critical operations.

17 Claims, 1 Drawing Sheet

MULTIPLE-NETWORK SYSTEM AND METHOD FOR LOADING, TRANSFERRING AND REDEEMING VALUE THROUGH STORED VALUE ACCOUNTS

CROSS-REFERENCE TO RELATED APPLICATIONS

This application claims the benefit of and priority to U.S. Provisional Patent Application No. 60/572,641 filed May 18, 2004 the technical disclosures of which are hereby incorporated herein by reference.

TECHNICAL FIELD

The present invention relates generally to electronic stored value accounts and more specifically to two linked systems of stored value accounts, one system being on a major network and the second system being on a secondary network, providing multiple paths to perform critical operations.

BACKGROUND OF THE INVENTION

Stored value accounts are being applied to a variety of industries. The most notable are prepaid phone cards and prepaid debit cards. A prepaid debit card can be, for example, an ATM card, a PIN-based card (such as a Maestro card, STAR card or an Interlink Card), or a prepaid MasterCard or prepaid Visa card, which can be used for signature based purchases. The cardholder, usually a consumer, loads value onto their stored value card, and is able to spend that value or take it out at an ATM machine. The "Major Networks", namely the Visa and MasterCard networks (and to a lesser extent, the American Express, Novus, Discover, JCB, Diners Club, Star, Pulse, and other similar networks), provide an excellent network for the use of credit and debit cards for purchases and ATM withdrawals.

The cardholder can also transfer value from their card to another card which is either owned by them or by another person. This can be used to perform remittances or payments to another person, perhaps at a distant location.

Systems exist for loading value onto prepaid debit cards, as operated by numerous banks, processors and companies in the industry. One common system allows money to be transferred from a consumer's checking or saving account to a prepaid card account via the Automated Clearing House (ACH) network. Another common system allows an employer, through its bank, to deposit payroll via Payroll Direct Deposit, onto the prepaid card. Another system allows people to make a deposit at a Western Union or MoneyGram outlet, and have that money routed to their prepaid card. A less common system allows the cardholder to pay money to a retail merchant, and have that retail merchant route the money to their prepaid card via a web-based interface or a card-swipe terminal. Most of these systems utilize electronic funds transfer technologies offered and operated by various banks (such as Bank of America and CitiBank) and processors (such as First Data, Metavante, and WildCard Systems).

The problem with the system that transfers money from a checking account to a card is that many consumers who seek prepaid cards do not have a checking account. In the case of Payroll Direct Deposit many consumers who seek prepaid cards do not have jobs that offer Payroll Direct Deposit. Regarding the system that utilizes Western Union or MoneyGram, such loads are expensive, and very few card issuers have contracts with Western Union or MoneyGram to perform such loads. The problem with the system that requires a retail merchant to route the money to the prepaid card is that each merchant must be approved by Visa or MasterCard to perform such loads, and in many cases must pay prohibitive fees for this permission.

Prepaid cards on the Visa-Plus ATM network and the MasterCard-Cirrus ATM network have utility for performing foreign remittances. A customer in one country procures, for example, two cards, and sends the second card to a relative or associate in another country. When the customer receives a paycheck or otherwise makes a deposit onto the first card he can then transfer some of those funds to the second card. The relative or associate can then withdraw the transferred funds at an ATM machine in the local currency. The advantage of this method is that the transfer can be instantaneous. However, one problem with this method is that the card-issuing bank and the card association (Visa or MasterCard) make a profit on the foreign exchange, often marking up the exchange rate by 3 to 7%. This is a "hidden fee", which lessens the amount of the transfer. For example, for a $300 remittance, a 7% markup is equivalent to $21.

Therefore, it would be desirable to provide a means of eliminating or reducing the above problems with the existing Network cards.

SUMMARY OF THE INVENTION

The present invention provides a system and method for loading, transferring and redeeming value whereby two different systems of stored value accounts, one system being on a major network and the second system being on a secondary network, are linked, providing multiple paths to perform critical operations.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
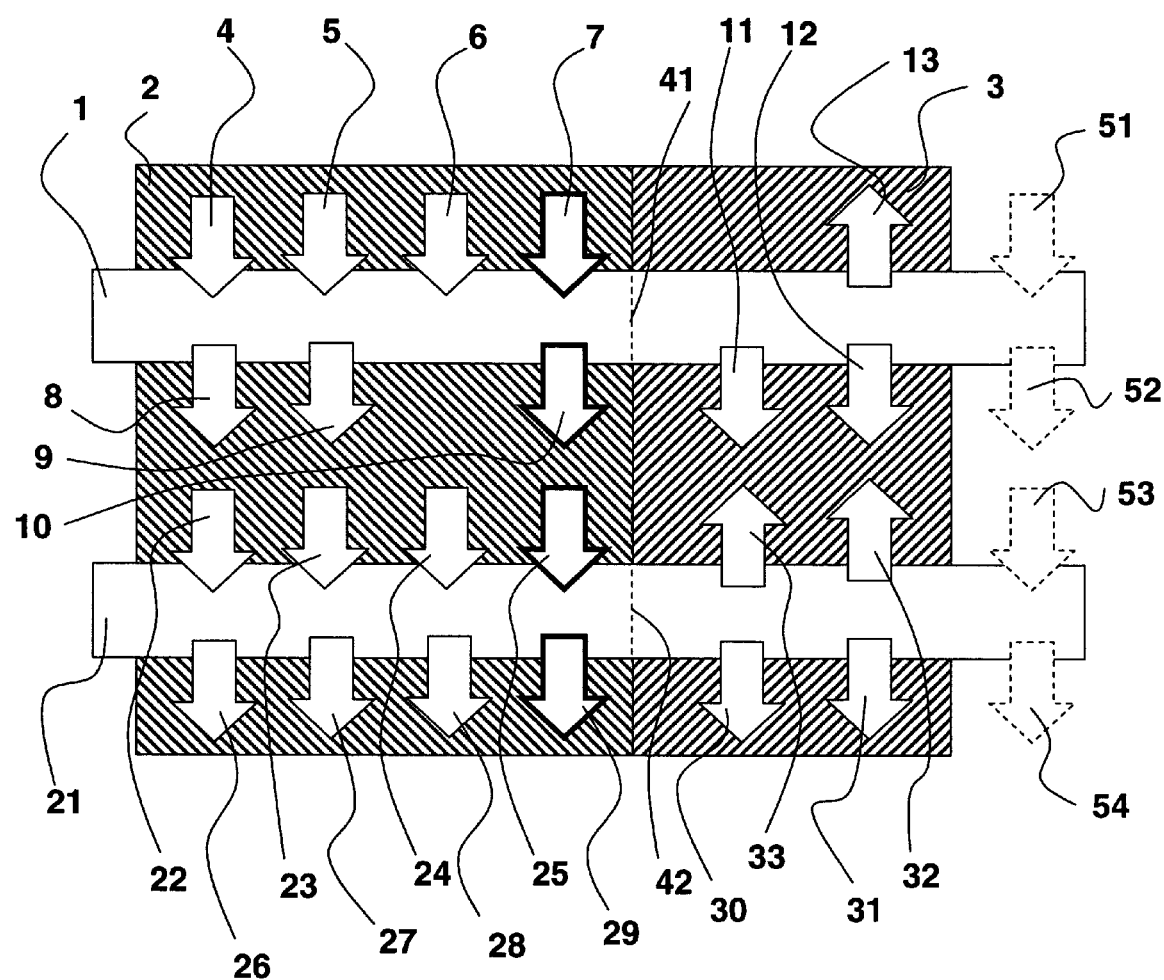
FIG. 1 shows a schematic representation of the system comprising two separate networks operated in parallel, which can be operated together under the current invention to perform as one network.

Referring to FIG. 1, the present invention utilizes a Primary Network 1, which may be one or more of the Major Networks, which provides for the authorization and settlement of card-based and/or account-based transactions in one country 2 and optionally in one or more additional countries 3. A card, be it a credit card, debit card, gift card, stored value card, virtual card or other form of account (all of which are referred to from this point forward as a "Card"), issued on the Primary Network 1 (hereinafter referred to as a "Primary Card") can be setup with several means of adding value, including electronic transfers from bank accounts (such as via the Automated Clearing House (ACH) network) 4, Payroll Direct Deposit (whether via the ACH network or via loading through some proprietary means) 5, loading by the deposit of funds at a retail or agent location 6, and by the transfer from another Card product on the same or a different network 7. A Primary Card can also provide, via the Primary Network, several means of removing or expending funds within the country of issue, including the making of Point-of-Sale (POS) purchases 8, the withdrawal of funds from an Automated Teller Machine (ATM) 9, or the transfer of funds off the Primary Card 10, whether this transfer be to another Card product on the same or a different network, or to a bank account, or to another recipient.

A Primary Card can also provide, via the Primary Network, several means of removing or expending funds within another country, including the making of POS purchases 11, the withdrawal of funds from an ATM 12, or the withdrawal of funds at a retail or agent location 13.

The present invention also utilizes a Secondary Network 21 which provides for the authorization and settlement of card-based and/or account-based transactions in one country 2 and optionally in one or more additional countries 3. The Secondary Network can be a proprietary network operated by a private organization, or can be a large network operated by an established, large card processor, and can have linkage or functionality tied to one or more of the other Major Networks, provided that it has the independent functionalities required to perform its duties within the present invention.

A Card issued on the Secondary Network 21 (called a Secondary Card) can be setup with several means of adding value, including electronic transfers from bank accounts (such as via the ACH network) 22, Payroll Direct Deposit (whether via the ACH network or via loading through some proprietary means) 23, loading by the deposit of funds at a retail or agent location 24, and by the transfer from another Card product on the same or a different network 25. A Secondary Card can also provide, via the Secondary Network, several means of removing or expending funds within the country of issue, including the making of POS purchases 26, the withdrawal of funds from an ATM 27, the withdrawal of funds at a retail or agent location 28, or the transfer of funds off the Card 29, whether this be to another card product on the same or a different network, or to a bank account, or to another recipient.

A Secondary Card can also provide, via the Secondary Network, several means of removing or expending funds within another country, including the making of POS purchases 30, the withdrawal of funds from an ATM 31, the withdrawal of funds at a retail or agent location 32, or the transfer of funds off the Card 33, whether this be to another card product on the same or a different network, or to a bank account, or to another recipient.

Most Major Networks maintain information about their cards and account balances and perform authorizations and settlements in a fixed currency. This is usually (but not always) the currency of the country in which the card is issued. If value is stored in the currency of one country 2 and expended in a second country 3, it must be converted to a second currency (usually the currency of the second country). For the purpose of simplification and illustration, this change of currency can be represented by a boundary 41 within the Primary Network, or a boundary 42 within the Secondary Network.

The Primary and Secondary Networks also store and make available certain data pertaining to the holders of cards and accounts. Data can be put into the Primary Network 51 and viewed or taken out of the Primary Network 52, and can be put into the Secondary Network 53 and viewed or taken out of the Secondary Network 54. This data can include the name, address, various identity numbers, date of birth, demographic data, contact information and any other information for each cardholder or account holder. Usually, data is put into the Network during enrollment for a Card or account, and may be updated from time to time by an approved administrator or in some cases by the cardholder or account holder himself.

The present invention links together a Primary Network and a Secondary Network. This can be accomplished, for example, utilizing the Transfer-in and Transfer-out functions of the two programs 7, 10, 25 and 29. For example, funds held in a card or account on the Primary Network can be transferred to a card or account on the Secondary Network by transferring from the Primary Card 10 and transferring to the Secondary Card 25. Similarly, funds held in a card or account on the Secondary Network can be transferred to a card or account on the Primary Network by transferring from the Secondary Card 29 and transferring to the Primary Card 7. The linkage can also provide for the transfer of data (51, 52, 53 and 54), such as names and other personal information between different Networks and different programs within Networks.

The performance of such transfers is not trivial, and requires business permission, technology access, and compliance with rules and regulations on both Networks. Business permission requires that the processors and card issuers for both Networks will allow a transfer to or from the other network. Technology access requires that the operators of one or both of the Card products have access to perform the transfers to and from both card programs. Compliance with rules and regulations (e.g., the Patriot Act, money laundering laws, etc.) requires that the owners of both cards and accounts are known and have had their identities verified to the degree required by law. This can be most easily met if the same individual owns both Cards involved in the transfer.

Currently, within the industry, card programs exist wherein transfers may be made from a Card within one network to a Card within the same network, providing some utility for remittances and payments. Such a transfer is usually initiated by the cardholder who is sending the payment, by calling a telephone number or visiting a web site that offers such functionality for the originating card. The present invention, while utilizing this existing functionality, goes one step further, and provides for seamless transfers between card programs on different networks.

The enrollment of cardholders, the issuance of cards and the movement of funds to and from cards is governed, for the Primary Network, by the relevant card association (e.g., Visa, MasterCard or other association). The rules and regulations on such activities are strict, and permission must be obtained in advance for any company that wishes to perform such functions, often requiring the payment of a fee (such as the current $5,000 Member-Service-Provider fee payable to MasterCard). Proprietary networks, such as may be used for the Secondary Network, do not usually have such restrictions. An example is a gift-card program, such as the Starbucks gift card. The issuance, loading and unloading of this card does not require any bank or association approval.

EXAMPLES OF THE CURRENT INVENTION

One exemplary embodiment of the present invention is the case wherein the Primary Card is, e.g., a Reloadable Prepaid MasterCard (also called a Debit MasterCard or Stored Value MasterCard), and the Secondary Card is a proprietary stored value card which is not functional on the Major Networks.

These Primary Cards may be issued by a US bank, and the funds for the totality of Primary Card accounts that are issued under a given program may be held in US dollars in a pooled account at the card issuing bank. This Primary Card may also be connected to the Maestro and Cirrus networks (both part of the MasterCard network), providing functionality for PIN-based purchases and ATM withdrawals. A cardholder interface (accessible by both web and phone) may provide cardholders with access to administer their accounts, including the initiation of card-to-card transfers.

The Secondary Card program in these examples may be operated by means of 1) a database for maintaining card balance information, and 2) web-based interfaces for performing load, purchase, and withdrawal functions at a network of remote locations. A cardholder interface (accessible by both web and phone) may provide cardholders with access to administer their accounts, including the initiation of card-to-card transfers. The funds for the totality of Secondary Card accounts issued under this example program may be held in one or more pooled bank accounts in one or more currencies.

For the following examples, the same company (the "Company") operates (or is the co-brander or issuer of) both the Primary Card and the Secondary Card. The Company owns or has business relationships with a network of retail locations that will issue and load the Secondary Cards. The Company owns or has business relationships with a network of retailers that will accept the Secondary Card for the purchase of goods and services. The Company also owns or has business relationships with a network of retail locations that will facilitate cash withdrawals from Secondary Cards.

The Company has permission from, e.g., MasterCard, to sell its Primary Card to consumers in the US subject to obtaining their name, address, social security number and date of birth. The Company, however, does not have permission to sell the Primary Cards directly through retail locations. Such permission would require each retail location to register with MasterCard and pay a fee, and have all sales and promotional materials approved by MasterCard. Furthermore, MasterCard rules stipulate that reloadable prepaid MasterCards are not allowed to be sold over the counter, and must always be embossed with the cardholder's name and delivered individually by mail. This restriction does not apply to the Secondary Card.

The Company has access to and controls the cardholder data (such as identity information, balances and transaction records) for both the Primary Cards and the Secondary Cards.

In the following examples, agents of the Company (the "Agents") maintain an inventory of Secondary Cards to sell, and can perform the loading and unloading of Secondary Cards, and retailers (the "Retailers") can perform the loading of Secondary Cards, and the honoring of Secondary Cards for the purchase of goods and services.

Example 1

Card Issuance

A consumer visits an Agent location, and purchases a Secondary Card. The agent collects the cardholder's name, address, social security number and date-of-birth, and optionally examines and records a picture ID (such as a passport or drivers license). The cardholder instantly receives a Secondary Card.

The first time the cardholder accesses the cardholder interface for the Secondary Card (by phone or internet) he may be offered the opportunity to obtain a Primary Card. As this sale of the Primary Card (e.g., Prepaid MasterCard) is being made by the Company to its existing customer, the Retailer does not need to be approved by MasterCard for the sale of MasterCard products. As the ID-verification for the Secondary Card is at least as rigorous as that required for the Primary Card, the Company does not need to do any further verification or obtain any further information to fulfill the Primary Card. The linkage between the two programs (Primary and Secondary Cards), which is part of the present invention, facilitates this transfer of information.

The advantage to the Company is that it does not need its network of Retailers to be approved for the sale of MasterCard (or other Primary Card) products. The advantage to the retailers is that they can be indirectly involved in the sale of a MasterCard product without needing to pay the fees for the direct sale of a MasterCard product. The advantage to consumers is that in providing their information once, they can essentially enroll for two cards. A further advantage is that the consumer leaves the retail location with a card (the Secondary Card) in hand.

The holder of the Secondary Card may order the Primary Card through the phone-based or web-based cardholder interface or through any other means provided by the Company. The Company may, at its election, instantaneously provide the customer with the card number for the Primary Card. A scenario for this delivery of the card number is given below:

Step 1. The customer purchases and enrolls for a Secondary Card at an Agent location. He can load value onto that card if desired (see Example 2 below).

Step 2. The customer calls the customer support number printed on the back of the Secondary Card, thereby accessing the cardholder interface as provided through an automated Voice Response Unit (VRU).

Step 3. The customer selects, via the phone keypad, the VRU option that corresponds to the purchase of or enrollment for a Primary Card.

Step 4. Upon successful completion of enrolment for the Primary Card, the VRU can read out the Primary Card number, expiration date and other information for the Primary Card.

The Company can, optionally, instantly activate the Primary Card. The customer can then transfer funds from the Secondary Card to the Primary Card. The customer then has a fully active Primary Card with funds available, and can use the card number for any card-not-present transaction (such as an internet purchase or an over-the-telephone purchase) on the Primary Network. The advantage provided by the present invention is that the cardholder does not have to wait the usual seven days for the Primary Card to be embossed and mailed to him. Instead, he can obtain the card number and begin making card-not-present purchases immediately.

Example 2

Card Loading

A consumer with a Secondary Card can visit a participating Retailer or Agent and load value onto the Secondary Card. The Retailers or Agents can accept payment from the cardholder as cash, a check, or any other monetary instrument that they elect to honor. The Retailer or Agent would then access the Secondary Network, either through a web-based interface, a telephone-based interface, a card-swipe terminal programmed to interface with the Secondary Network, or by any other means provided. Only approved, registered Retailers and Agents would have such access to the Secondary Network. They would enter the necessary card or account information to facilitate the loading of the deposit amount onto the correct card. They may be paid a fee by the Company and/or the cardholder for providing this service. The cardholder could then leave the Retailer or Agent location with the funds available on the Secondary Card. Optionally, the Company may place a hold on the deposit, either for some set period, or until the funds have cleared (e.g., if paid by check or other promissory means).

As soon as the funds are available (usually instantaneously), the cardholder can either spend some or all of the funds at any retail location on the Secondary Network, or he can transfer some or all of the funds to another card within a participating card program on the Primary or Secondary network. If, as in Example 1, the cardholder has also procured a Primary Card, he can transfer funds to that card.

In this fashion, within the present invention, a Retailer or Agent on the Secondary Network can indirectly participate in the loading of funds onto a Primary Card (a prepaid MasterCard in this example), even though they are not necessarily approved to load a MasterCard product.

The power of this capability can be magnified as follows. The Company may form relationships with many other businesses that operate card programs on any of the Major Networks. If these other businesses elect to participate, they can each accept transfers from the Company's Secondary Card onto their own Primary Card. In this way, the network of Retailers and Agents on the Secondary Network can facilitate loads that end up on a variety of Cards provided by numerous businesses on numerous Primary Networks without having direct relationships with these businesses or Primary Networks.

In a further step, numerous Secondary Networks can be so linked, providing such two-step loads for all participating card programs (whether they are on a primary Network or another Secondary Network).

Example 3

Transfers

Once funds are available on a Secondary Card or a participating Primary Card, they cannot only be transferred to another Card owned by the same person, but they can also be transferred to any Card owned by any second person, provided the second person's Card is issued from a participating program that allows transfers from the first person's program. Such program-to-program transfers already exist in the industry in limited situations. For example, a company that issues prepaid MasterCard products for two different clients may allow one client's cardholders to transfer funds to another client's cardholders.

With the present invention, the scope and capability of these transfers is broadened. For example, a first consumer obtains a Secondary Card issued by the Company, and a Primary Card in the form of a Prepaid MasterCard issued by a first bank. A second consumer has a prepaid Visa card issued by a second bank, and that second bank allows transfers from the Company's Secondary Cards. The first consumer may wish to pay, e.g., $100 to the second consumer from the balance on his Primary Card. Unfortunately, as is usual in this industry, the two banks do not allow or have the capability of transferring funds between their Primary Card programs. The first consumer could do the following:

Step 1. Transfer $100 from the Primary Card to the Secondary Card.
Step 2. Transfer $100 from their Secondary Card to the second consumer's Primary Card.

The Company, being in control of the data and transfers for both of the first consumer's cards, could even provide for both steps of this transfer transaction to be initiated by a single request for the transfer from the first consumer's Primary Card to the second consumer's Primary Card, even though no direct link exists.

Ordinarily, the full linkage of 100 separate Primary Card programs (involving different banks, different processors, and different card associations) would require 5,050 different relationships to allow any card to transfer funds to any other card. With the present invention, only 100 relationships are required, connecting each Primary Card program to the Company's Secondary Network.

Example 4

Purchases

When a purchase is made with a Primary Card, the card association charges the merchant a "discount rate", being a fee that is usually a percentage of the sale price. This fee is typically 1.5% for Visa or MasterCard purchases, and may be higher or lower for other associations. If the purchase occurs without the card being present (e.g., for internet or telephone purchases) an additional 1% may be added to the discount rate. This fee is split between the card association and the card-issuing bank, and portions of it may be paid to the cardholder or the company operating the card program.

Purchases on a Secondary Network may incur a discount rate of any amount, or may incur no discount rate, at the election of the operator of the Secondary Network and the different companies issuing cards on that network. In this example, a specific merchant (the "Merchant") may join the Secondary Network and accept Secondary Cards for purchases without incurring a discount fee.

A consumer who is in possession of both a Primary Card and a Secondary Card may visit the Merchant to make a purchase, e.g., of a $300 item. The Merchant in this example accepts both Cards as forms of payment (the Primary Card being a prepaid MasterCard in this example). If the Merchant receives the payment on the Primary Card, it will pay MasterCard $4.50 in the discount rate, reducing the profit by $4.50. If the Merchant receives the payment on the Secondary Card, it will pay no discount rate. The Merchant may offer an inducement, such as a rebate or a discount, for the customer to pay using the Secondary Card.

Cardholders with both Primary and Secondary Cards can instantly transfer funds between the Cards, thereby using whichever card best suits their needs. When shopping at merchants that are not on the Secondary Network, for example, the cardholder would choose to pay with the Primary Card.

Example 5

Basic Remittances

Primary Card programs can be used for remittances, where funds are transferred from one person to a second person, often in a foreign country. The present invention provides benefits in the area of foreign remittances. In this example, remittances are sent from the US (originating in US dollars) to Mexico (being received in Mexican Pesos).

A remittance-sender in the US (the "Sender") possesses, in this example, both a Secondary Card and a Primary Card, and is able to transfer funds between them. The Sender wishes to send money to a remittance-receiver in Mexico (the "Receiver"), who might be a relative or associate. The Sender purchases an additional Primary Card and an additional Secondary Card, both issued in the Sender's name. The Sender delivers both additional cards to the Receiver in Mexico. These are herein referred to as the Receiver's Cards, even though they are still registered under the Sender's name.

The Sender has two basic options to perform a $300 remittance.

Option 1: The Sender can transfer the $300 from either the Secondary Card or the Primary Card (via the Secondary Card) to the Receiver's Primary Card (e.g., a prepaid MasterCard). The Receiver can then withdraw the $300 in Pesos at any ATM that is on the MasterCard/Cirrus Network. In doing so, the Receiver may incur three separate fees: 1) an ATM fee assessed by the ATM owner; 2) a foreign ATM withdrawal fee charged by the Primary Card issuer; and 3) a foreign exchange markup fee. These three fees are discussed below. For purposes of example, assume the exchange rate is 1 US Dollar=10 Mexican Pesos.

Fee 1: The ATM owner in Mexico charges a fee of 10 Mexican Pesos, corresponding to $1 US.

Fee 2: The bank and business operating the Primary Card program imposes a $4.50 fee for ATM withdrawals made outside the US. This is typical for this industry, and is charged to the card at the time of the withdrawal. Of this, about $2.50 is payable directly to MasterCard and other network and switching partners involved in providing the global ATM network.

Fee 3: In principle, the Receiver has received 3,000 Mexican Pesos (according to the published exchange rate). The withdrawal in a foreign currency, however, incurs a foreign exchange markup fee of typically 3 to 7%. In this example, 5% is used. The foreign exchange markup fee is often considered as a "hidden fee", as the consumer is sometimes not aware that it is incurred. This markup is typically split between the card issuing bank, the card program operator and MasterCard. For every 10 Mexican Pesos withdrawn, the amount debited to the card will be $1.05 (in this example), not $1.00 as the published foreign exchange rate would indicate. If 3,000 Mexican Pesos were to be withdrawn, the Primary Card would be debited US $315.

By the time all three fees are assessed, the remittance of US $300 results in the receipt of about 2800 Mexican Pesos. A total fee incurred by the Receiver is about 200 Mexican Pesos or US $20. The convenience of being able to use almost any ATM machine for the withdrawal at any time of the day or night may warrant the paying of these fees.

There may also be load and transfer fees incurred by the Sender.

In a variation of this Option 1, the Receiver may have enrolled for his own Primary Card (still issued from the US in US-dollars), if allowed to do so.

This option is similar to the standard way card-to-card remittances are performed in the industry. The present invention provides some superior alternatives to this method.

Option 2: The Sender can transfer the $300 from either the Secondary Card or the Primary Card (via the Secondary Card) to the Receiver's Secondary Card. The Receiver can then withdraw the $300 in Pesos at any participating Agent location. In doing so, the Receiver may incur two separate fees: 1) a withdrawal fee charged by the Agent; and 2) a foreign exchange markup fee.

Fee 1: The Agent in Mexico charges a fee of 40 Mexican Pesos, corresponding to $4 US.

Fee 2: The foreign exchange markup on the Secondary Card is 0.5%. If 3,000 Mexican Pesos were to be withdrawn, the Secondary Card would be debited $301.50 US.

By the time both fees are assessed, the remittance of US $300 results in the receipt of about 2945 Mexican Pesos. The total fee incurred by the Receiver is about 55 Mexican Pesos or US $5.50. For Receivers who are close to an Agent location, the cost benefits provided by the present invention are clear.

There may also be load and transfer fees incurred by the Sender.

The operation of Option 2 requires that the Secondary Network (or its agent) perform the foreign exchange from US dollars to Mexican Pesos. In order to receive the best possible exchange rate (and thereby minimize the foreign exchange markup charged to the remitter), the Secondary Network might perform the following steps or similar steps in foreign exchange.

Step 1. The Secondary Network would provide working capital in Mexico sufficient to honor a practical volume of withdrawals at Agent Locations, for example, 3,000,000 Mexican Pesos (equivalent to US $300,000), being enough to cover one thousand $300 remittances.

Step 2. The Secondary Network would allow remittances to occur until, say, 50% of this working capital had been paid out to remittance-receivers (i.e., 1,500,000 Mexican Pesos).

Step 3. The Secondary Network would then transfer the approximately US $150,000 collected from remittance-senders in the US to its account in Mexico, converting it to about 1,500,000 Mexican Pesos. In transferring such a large amount, the Secondary Network may obtain an exchange rate very close to the published rate, perhaps incurring only a 0.25% markup.

In contrast, if 500 separate payments of $300 were converted, the foreign-exchange bank or partner may charge several percent in foreign exchange markup. By converting currencies in large bulk amounts, the Secondary Network can keep its foreign exchange markup low. This process does require that the Secondary Network provide working capital on the receiving-side of the border, sometimes referred to as "financing the float". However, the cost of such short-term financing is small compared to the savings that are achieved by reducing foreign exchange markup.

In a variation of this Option 2, the Receiver may enroll for or purchase his own Secondary Card issued in Mexico. The currency of this Mexican Secondary Card might be Pesos. In this scenario, foreign exchange is still performed by the Secondary Network, using the bulk conversion principles outlined above.

Example 6

Advanced Remittances

Following on from Example 5, the Receiver may have the opportunity to enroll for or purchase his own Primary Card (e.g., a prepaid Visa Card), issued by a bank in his own country (e.g., Mexico) with funds held in local currency (Mexican Pesos). In this example, the Mexican Primary Card program is linked to the Company's Secondary Card program, subject to the present invention.

The Sender now has a third option to perform a $300 remittance.

Option 3: The Sender can transfer the $300 from either the Secondary Card or the Primary Card (via the Secondary Card) to the Receiver's Mexican Primary Card (possibly via the Receiver's Secondary Card). The Receiver can then withdraw the $300 in Pesos at any ATM that is on the Visa/Plus Network. In doing so, the Receiver may incur two separate fees: 1) an ATM fee assessed by the ATM owner; and 2) a domestic ATM withdrawal fee charged by the Mexican Primary Card issuer. Since the withdrawal is performed in Pesos and the Mexican Primary Card is issued in Pesos, there is no Foreign Exchange Markup fee charged by the Mexican Primary Network. Thus, the two fees are:

Fee 1: The ATM owner in Mexico charges a fee of 10 Mexican Pesos, corresponding to $1 US.

Fee 2: The bank and business operating the Mexican Primary Card program imposes a $1.50 fee for ATM withdrawals within Mexico. This is typical for domestic withdrawals in this industry, and is charged to the card at the time of the withdrawal. Of this, about $0.75 is payable directly to Visa and other network and switching partners involved in providing the domestic Mexican ATM network.

By the time both fees are assessed, the remittance of US $300 results in the receipt of about 2975 Mexican Pesos. The total fee incurred by the Receiver is about 25 Mexican Pesos or US $2.50. As an added bonus, the Receiver has the convenience of being able to use almost any ATM machine in Mexico for the withdrawal at any time of the day or night.

There may also be load and transfer fees incurred by the Sender.

This option is far superior in cost to Option 1, and is superior in cost and convenience (and availability of withdrawal locations) to Option 2. This is a prime example of the benefits available under the present invention.

The offering of this Option 3 requires that the Secondary Network move the funds across the border so that the loading of funds onto the Mexican Primary Card is done in Mexican Pesos. Accordingly, the Secondary Network will be required to perform the foreign exchange of bulk amounts as discussed in Option 2 above.

Example 7

Payroll Card Program

One common use of prepaid Primary Cards in the US is for Payroll Cards. Employees enroll for a Primary Card. Each pay cycle, the employer deposits each employee's pay onto the cards instead of giving them a paper check. This eliminates the problems with lost or altered checks, and eliminates the cost of issuing checks. It is also convenient for unbanked employees, and eliminates the need for them to visit a check-cashing station each pay day. It can also provide the unbanked employee with a plastic debit card which has functionality for POS purchases and card-to-card transfers (e.g., for remittances). It is also useful for mobile employees like truck drivers, who have difficulty in receiving a paper check, but who can use their payroll cards at any ATM machine to receive their pay.

One problem with payroll card programs is that it costs the employees to receive their pay in this manner. This cost comes from the ATM withdrawal fees and the monthly fees on the card. Many employers will not implement a payroll card program because of these fees, which are considered unfair or even unlawful in some regions and circumstances.

Many employers would adopt a payroll card program if the program offered one free withdrawal each pay cycle; however this is not usually possible within the cost structure of card programs on the Primary Networks.

A further problem with payroll cards is that if a prepaid MasterCard or prepaid Visa card is offered as the Primary Card, employees can sometimes unintentionally (or intentionally) overcharge on their cards. This can result in the card being suspended or cancelled by the bank or processor, interfering with the processing of the next payroll.

A Secondary Card could be offered as a payroll card, such as a proprietary stored value card that is not connected to any of the major networks. This would potentially be a cheaper product to offer, however it would be restricted in where the employee could withdraw funds. Employees might be able to withdraw cash at a participating Agent on the Secondary Network, however they would not be able to withdraw funds at ATM machines, or make purchases at retail locations on the Primary Network.

The present invention provides a solution that takes the best benefits of both the Primary Card and the Secondary Card. An employer could offer its employees a Secondary Card issued by the Company. Local Agents on the Secondary Network or specially programmed ATM machines (operated by the Company) near the work place could offer employees one free cash withdrawal each pay cycle. This would take advantage of the lower cost structure of card programs on the Secondary Network.

Each employee could also qualify to enroll for a Primary Card (e.g., a prepaid MasterCard), also offered by the Company. Employees could transfer all or part of their pay to their Primary Card, and thereby take advantage of POS purchase capability and withdrawals through the global ATM network.

This solves the problem that arises from overcharging, as the employee would only lose their Primary Card, not their Secondary Card (which receives the payroll). Employees would have access to a free cash withdrawal at the provided location, but could still take cash out at any ATM (and pay the corresponding fees) if they chose to. Employees could also take advantage of the superior remittance functions and other benefits available within the present invention.

Variations of the Present Invention

Although the above examples describe two parallel networks interacting to provide benefit, the present invention can actually comprise three or more distinct networks interacting with each other.

In addition the above examples involving the issuance and use of Cards, the same invention and benefits might be obtained for accounts that do not require a card, such as virtual-card accounts, chip-based accounts (like smartcards), paper-based accounts, web-based accounts or email-based accounts (similar to PayPal).

Some of the transaction flows involve moving funds from a Primary Card to a Secondary Card and then on to another Primary Card. Strictly speaking, the Secondary Card only needs to exist in principle, not in practice. Even if the transfer steps involving the Secondary Card only exist in computer data and computer program logic, and even if no physical Secondary Card exists, such a movement of funds would still fall within the current invention. A straight card-to-card transfer between two Primary Cards would not fall under the current invention. However if that movement of funds utilized an intermediate step based on a separate card, account, business relationship, business permission, or network connection, then it would fall under the current invention.

The examples above describe the interaction between a Primary Network and a Secondary Network. However there may be situations where the present invention can be utilized by linking two Primary Networks or by linking two Secondary Networks. This type of linkage could result in benefits under the present invention if, for example, the two Networks had different price structures and/or functionalities, and the transferring of funds backwards and forwards between the networks within the flow of a multi-step transaction resulted in greater functionality or reduced costs, or other advantages. This may also include the scenario wherein two Secondary Networks exist in two different countries in two different currencies, and linkage of the programs resulted in multiple paths for performing the certain complex functions, so that the movement of funds backwards and forwards between the two Networks resulted in benefits that either Network alone could not achieve.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

I claim:

1. A system for electronic exchange between stored value accounts, the system comprising:
   (a) a first network for electronically transferring values to and from stored value accounts;
   (b) a second network for electronically transferring values to and from stored value accounts;
   (c) a service provider including:
      (1) means for maintaining accounts on both networks for each customer;
      (2) means for transferring values between an account on the first network and an account on the second network;
      (3) means for directly transferring values between two accounts on the second network;
      (4) means for indirectly transferring values between two accounts on the first network, wherein said transfer occurs via at least one account on the second network that is owned in common with one of said accounts on the first network;
   (d) means for receiving a request to transfer value between a first account and a second account;
   (e) means for calculating an optimal exchange path that minimizes transaction costs for the transfer in part (d), wherein said optimal exchange path can include multiple inter-network and intra-network transfers through intermediate accounts;
   (f) means for executing the transfer request in part (d) from the first account to the second account according to an optimized exchange path;
   (g) wherein the service provider includes business permissions from both the first network and second network to perform inter-network value transfers on behalf of customers; and
   (h) wherein the service provider includes customer permissions that automatically authorize transfers across intermediate accounts in the optimal exchange path calculated in part (e).

2. The system according to claim 1, wherein the first network is a credit and bank network that provides for the authorization and settlement of card-based and account-based transactions in at least one country.

3. The system according to claim 1, wherein the second network is a proprietary network that provides for the authorization and settlement of card-based and account-based transactions in at least one country.

4. The system according to claim 1, wherein the first account and second account in part (d) are owned by the same owner.

5. The system according to claim 1, wherein the first account and second account in part (d) are owned by different owners.

6. The system according to claim 1, wherein the first account and second account in part (d) are in different countries.

7. The system according to claim 1, wherein the first account and second account in part (d) are in different currencies.

8. The system according to claim 7, wherein the second network further comprises means for performing foreign exchange, comprising:
   (i) means for maintaining pool accounts in each currency sufficient to float multiple individual transfers totaling up to a specified value; and
   (ii) means for settling balances in bulk between said pool accounts when individual transfers total said specified value, wherein foreign exchange fees for said settling in bulk are lower than foreign exchange fees for said individual transfers.

9. A method for electronic exchange between stored value accounts, the method comprising the computer implemented steps of:
   (a) maintaining stored value accounts on a first network;
   (b) maintaining stored value accounts on a second network;
   (c) receiving a request to transfer value between a first account and a second account;
   (d) calculating an optimal exchange path that minimizes transaction costs for the transfer in step (c), wherein said optimal exchange path can include multiple inter-network and intra-network transfers through intermediate accounts, including:
      (1) transferring values between the first network and the second network;
      (2) directly transferring values between two accounts on the second network;
      (3) indirectly transferring values between two accounts on the first network, wherein said transfer occurs via at least one account on the second network that is owned in common with one of said accounts on the first network;
   (e) receiving business permissions from both the first network and second network to perform inter-network value transfers on behalf of customers;
   (f) receiving customer permissions that automatically authorize transfers across intermediate accounts in the optimal exchange path calculated in step (d); and (g) executing the transfer request in step (c) from the first account to the second account according to an optimized exchange path.

10. The method according to claim 9, wherein the first network is a credit and bank network that provides for the authorization and settlement of card-based and account-based transactions in at least one country.

11. The method according to claim 9, wherein the second network is a proprietary network that provides for the authorization and settlement of card-based and account-based transactions in at least one country.

12. The method according to claim 9, wherein the first account and second account in step (c) are owned by the same owner.

13. The method according to claim 9, wherein the first account and second account in step (c) are owned by different owners.

14. The method according to claim 9, wherein the first account and second account in step (c) are in different countries.

15. The method according to claim 9, wherein first account and second account are in different currencies.

16. The method according to claim 15, further comprising performing foreign exchange on the second network by:
   (i) maintaining pool accounts in each currency sufficient to float multiple individual transfers totaling up to a specified value; and
   (ii) settling balances in bulk between said pool accounts when individual transfers total said specified value, wherein foreign exchange fees for said settling in bulk are lower than foreign exchange fees for said individual transfers.

17. A computer program product in a computer readable medium, for electronic exchange between stored value accounts, the computer program product comprising:

(a) first instructions for maintaining stored value accounts on a first network;

(b) second instructions for maintaining stored value accounts on a second network;

(c) third instructions for receiving a request to transfer value between a first account and a second account;

(d) fourth instructions for calculating an optimal exchange path that minimizes transaction costs for the transfer in part (c), wherein said optimal exchange path can include multiple inter-network and intra-network transfers through intermediate accounts, including:

(1) transferring values between the first network and the second network; (2) directly transferring values between two accounts on the second network;

(3) indirectly transferring values between two accounts on the first network, wherein said transfer occurs via at least one account on the second network that is owned in common with one of said accounts on the first network;

(e) fifth instructions including business permissions from both the first network and second network to perform inter-network value transfers on behalf of customers;

(f) sixth instructions including customer permissions that automatically authorize transfers across intermediate accounts in the optimal exchange path calculated by said fourth instructions in part (d); and (g) seventh instructions for executing the transfer request in part (c) from the first account to the second account according to an optimized exchange path.

\* \* \* \* \*